United States Patent
Hladik

(10) Patent No.: US 6,519,296 B1
(45) Date of Patent: Feb. 11, 2003

(54) VARIABLE-INTERVAL PILOT SYMBOL AIDED MODULATION AND DEMODULATION

(75) Inventor: Stephen Michael Hladik, Albany, NY (US)

(73) Assignee: General Electric Company, Niskayuna, NY (US)

( * ) Notice: Subject to any disclaimer, the term of this patent is extended or adjusted under 35 U.S.C. 154(b) by 0 days.

(21) Appl. No.: 09/324,597

(22) Filed: Jun. 3, 1999

(51) Int. Cl.[7] .............................................. H04L 27/14
(52) U.S. Cl. .................... 375/325; 375/326; 375/340
(58) Field of Search ................................ 375/279, 326, 375/316, 322, 324, 325, 340

(56) References Cited

U.S. PATENT DOCUMENTS 5,381,449 A * 1/1995 Jasper et al. ................ 375/298
5,875,215 A * 2/1999 Dobrica ....................... 375/344

OTHER PUBLICATIONS

"An Analysis of Pilot Symbol Assisted Modulation for Rayleigh Fading Channels," James K. Cavers, IEEE Transactions on Vehicular Technology, vol. 40, No. 4, Nov. 1991.

* cited by examiner

*Primary Examiner*—Stephen Chin
*Assistant Examiner*—David B. Lugo
(74) *Attorney, Agent, or Firm*—Jill M. Breedlove; Christian G. Cabou

(57) ABSTRACT

The signaling overhead required for pilot symbol aided modulation is significantly reduced by recognizing that the residual uncertainty in the carrier frequency decreases after an initial carrier frequency estimate is made during an initial signal interval. This allows a commensurate reduction in channel process sampling rate during the remainder of the message; i.e., the frequency uncertainty of the pilot symbols can be decreased. This technique may be particularly effective when the rate of change of the received carrier frequency and phase is low as in fixed satellite terminal equipment. The resultant increase in spectral efficiency makes reduced-overhead pilot symbol aided modulation attractive for applications in low-cost/low-complexity terminal equipment.

10 Claims, 5 Drawing Sheets

VARIABLE-INTERVAL PILOT SYMBOL AIDED MODULATION AND DEMODULATION

BACKGROUND OF THE INVENTION

The present invention relates generally to modulation and demodulation in communications systems and, more particularly, to pilot symbol aided modulation techniques and associated receiver signal processing.

Pilot symbol aided modulation has been investigated for mobile communications applications since it facilitates estimation of the carrier signal, which is needed for coherent demodulation at the receiver. One technique is to periodically insert known pilot symbols (i.e., known symbols) into the sequence of modulated data symbols comprising the signal to be transmitted. These pilot symbols essentially sample the channel process. The receiver recovers the pilot symbols from the sequence of symbols received from the channel and uses a standard interpolation technique to reconstruct a coherent carrier for use in demodulation.

In the mobile application, pilot symbol aided modulation's main drawback is that it requires relatively high overhead because the carrier's frequency and phase can vary quite rapidly due to the Doppler effect. However, in a geosynchronous satellite communications system with stationary terminals, the apparent carrier frequency changes much more slowly. Therefore, although it is tempting to utilize pilot symbol aided modulation in order to simplify the terminal's receiver, the required overhead is still quite high when the channel process is sampled above the Nyquist rate based on the initial carrier frequency uncertainty. One cause of this carrier frequency uncertainty is the satellite's motion. Second, the use of low-cost oscillators in the system can result in unacceptable shorter-term frequency stability and significant longer-term frequency drift. Thus, while the receiver becomes less expensive to build, the high overhead required reduces system capacity and, therefore, nullifies any cost advantage in the system.

Accordingly, it is desirable to provide a pilot symbol aided modulation and demodulation signal processing which overcome the shortcomings described hereinabove. It is furthermore desirable to provide such modulation and demodulation techniques particularly as applicable to very small aperture satellite (VSAT) communications terminals.

BRIEF SUMMARY OF THE INVENTION

In accordance with preferred embodiments of the invention described herein, variable-interval pilot symbol aided modulation and demodulation techniques significantly reduce the signaling overhead required for pilot symbol aided modulation. Variable-interval pilot symbol aided modulation involves partitioning a transmitted message burst into at least two segments, generally of unequal length, such that the interval between pilot symbols differs; and corresponding demodulation signal processing involves reducing the channel process sampling rate (i.e., reducing the frequency of pilot symbols) after an initial carrier frequency estimate is made during an initial signal interval. A receiver recovers all of the pilot symbols in the received burst's shorter pilot inter-symbol interval segment and reconstructs an estimate of the received signal's carrier therefrom, the shorter pilot inter-symbol interval segment of the received burst being demodulated such that the estimated carrier is derived as in standard pilot symbol aided modulation techniques. The receiver calculates an estimate of the received signal's carrier frequency and phase from the pilot symbols in the shorter pilot inter-symbol interval segment of the received burst. In the longer pilot inter-symbol interval segment of the burst, the received carrier process is sampled by the pilot symbols at a lower rate such that frequency-shifted pilot symbols are used to obtain a local carrier for demodulation of the shorter pilot inter-symbol interval segment of the received burst. Switching circuitry is used to alternate between demodulating the shorter and longer pilot inter-symbol interval segments of the burst.

BRIEF DESCRIPTION OF THE DRAWINGS

The features and advantages of the present invention will become apparent from the following detailed description of the invention when read with the accompanying drawings in which:

FIG. 1 represents a basic burst structure for variable-interval pilot symbol aided modulation; FIG. 2 illustrates an exemplary burst structure for short messages; FIG. 3 illustrates an exemplary burst structure useful for minimizing delay in transmission and demodulation; and FIG. 4 represents a second exemplary burst structure for short messages.

DETAILED DESCRIPTION OF THE INVENTION

Variable-interval pilot symbol aided modulation in accordance with preferred embodiments of the present invention is based on recognition of the concept that residual uncertainty in the carrier frequency decreases after an initial carrier frequency estimate is made during an initial signal interval, allowing a commensurate reduction in channel process sampling rate during the remainder of the message. FIGS. 1–4 illustrate several message burst structures that utilize this concept. As used herein, the term burst refers to the duration of a transmission, regardless of its length. That is, the term burst is to be construed broadly to include both long and short transmission intervals. And the transmitted bursts specifically described herein are provided by way of example only.

In FIGS. 1–4, the transmitted symbols labeled P denote pilot symbols, and those labeled D are data symbols. As shown in FIGS. 1–4, the message burst that is transmitted via variable-interval pilot symbol aided modulation is partitioned into at least two segments in which the interval between pilot symbols differs. The order of segments in FIGS. 1–4 is given with reference to the order of their occurrence in time which may or may not be different from their order of processing in the receiver. The order of processing in the receiver depends on system requirements, channel characteristics, and burst length. For example, for FIGS. 1 and 3, the first segment is processed first in the receiver; but in FIGS. 2 and 4, the middle (or second) segment is processed first in the receiver for purposes of synchronization. In these cases, the first segment of the received burst is buffered for later processing. Further, the interval between pilot symbols is designated in FIGS. 1–4 using the symbol $T_{Pn}$, where n denotes the order of processing in the receiver. Note that $T_{P1}$ falls in the first segment of the burst of FIG. 1 and in the middle segment of the burst of FIG. 2.

Figure 1:
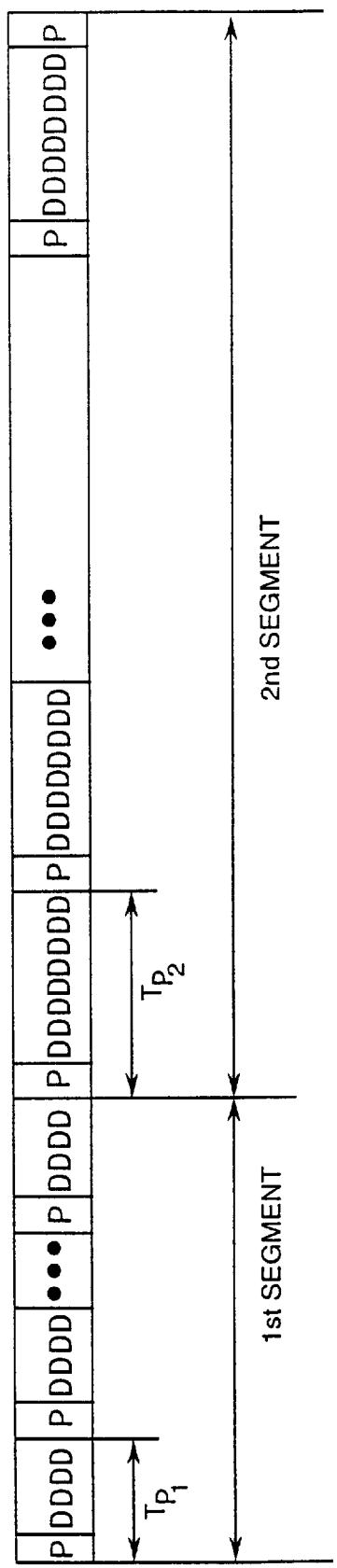
FIGS. 1–4 illustrate exemplary transmitted bursts useful in describing a receiver's synchronization and demodulation signal processing in accordance with preferred embodiments of the present invention as follows.

In the following description, the burst structure of FIG. 1 is used as an example in describing the receiver's synchronization and demodulation signal processing. The transmitted burst of modulated symbols in FIG. 1 is segmented into two parts or segments, generally of unequal length, as illustrated. The shorter pilot inter-symbol interval segment is referred to as the $T_{P1}$ segment; and the longer pilot inter-symbol interval segment is referred to as the $T_{P2}$ segment. That is, $T_{P1} < T_{P2}$. That is, the $T_{P1}$ segment refers to the burst segment having the pilot symbols occurring most frequently (the shorter pilot inter-symbol interval segment). The shorter pilot inter-symbol interval segment is the burst segment that is processed first in the receiver. In FIG. 1, the shorter pilot inter-symbol interval segment (i.e., the $T_{P1}$ segment) comprises the first transmitted segment.

Figure 5:
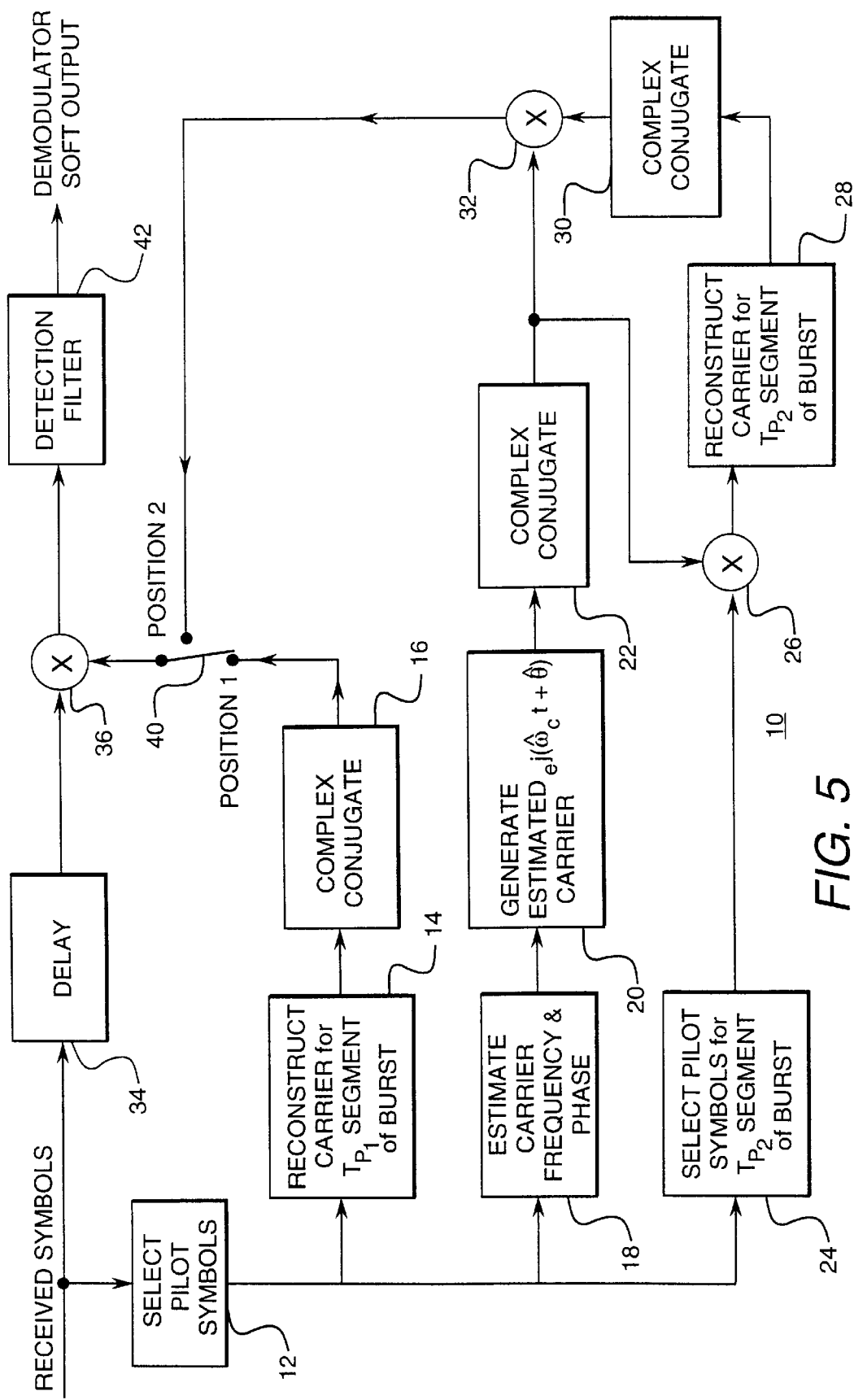
FIG. 5 is a block diagram illustrating a receiver in accordance with a preferred embodiment of the present invention.

A receiver 10 shown in the embodiment of FIG. 5 recovers all of the pilot symbols in the received burst in block 12 and reconstructs an estimate of the received signal's carrier from the pilot symbols comprising the shorter pilot inter-symbol interval segment (i.e., the $T_{P1}$ segment) in block 14. The $T_{P1}$ segment of the received burst is demodulated with the carrier derived from this step as in standard pilot symbol aided modulation techniques, the complex conjugate of the estimate of the carrier over the $T_{P1}$ segment being provided in block 16. It should be noted that pilot symbols from $T_{P1}$ segment of a burst are used advantageously in the recovery of the carrier for the $T_{P2}$ segment.

In block 18, the receiver calculates an estimate of the received signal's carrier frequency (and phase, if deemed desirable for the particular application) from the pilot symbols in the $T_{P1}$ segment of the received burst. (This step can be done in parallel with the demodulation of the $T_{P1}$ segment.) These carrier frequency and phase estimates are used in block 20 to generate an initial estimate of the received carrier during the $T_{P2}$ segment, the complex conjugate of which is provided in block 22. In particular, the output of block 20 is an estimate of the carrier over the $T_{P2}$ segment based on the estimate of the carrier frequency that is derived from pilot symbols in the $T_{P1}$ segment.

The pilot symbols for the $T_{P2}$ segment of the burst, via selection block 24, are multiplied in multiplier 26 by the appropriate samples of the complex conjugate of this estimated carrier in order to reduce the frequency uncertainty in the received carrier in the $T_{P2}$ segment. Since the received carrier process is sampled (by the pilot symbols) at a lower rate in the $T_{P2}$ segment of the burst, this multiplication step prevents aliasing during carrier signal reconstruction. These frequency shifted pilot symbols are then used to reconstruct the residual carrier in block 28 for the $T_{P2}$ segment of the burst via interpolation. The complex conjugate of the residual carrier for the $TP_2$ segment of the burst is then provided in block 30. The output of block 30 is multiplied in multiplier 32 by the initial carrier estimate from block 22 to obtain a local carrier for demodulation of the $TP_2$ segment of the received burst.

The sampled received burst is suitably delayed in delay block 34 to account for latency in the generation of the coherent reference for demodulation. The delayed received signal samples are multiplied in multiplier 36 by the complex conjugate of the carrier generated by the pilot-symbol-aided synchronization algorithm, via a switch 40, and filtered in a filter block 42 to produce the demodulator's soft output data. Switch 40 is in Position 1 for the demodulating the $T_{P1}$ segment of the burst and in Position 2 for the $T_{P2}$ segment.

Figure 2:
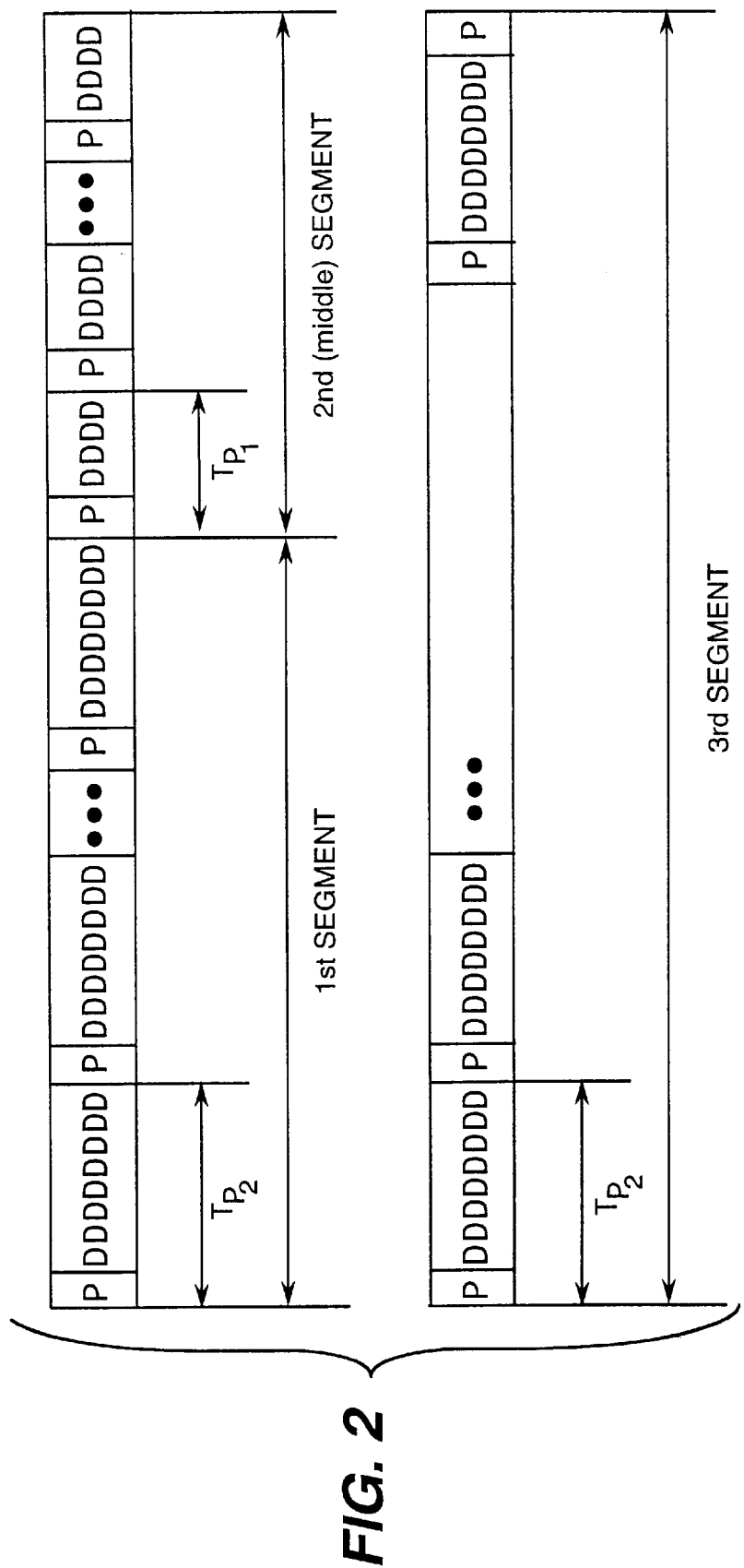
Figure 3:
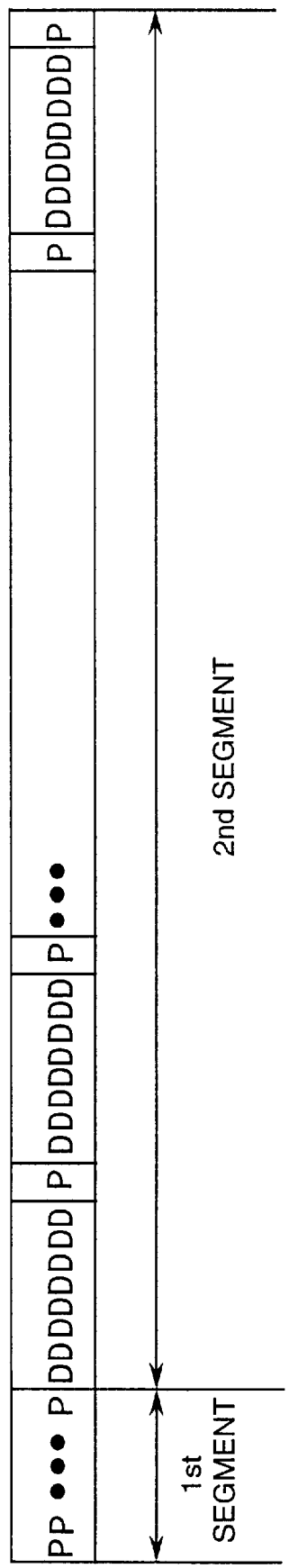
Figure 4:
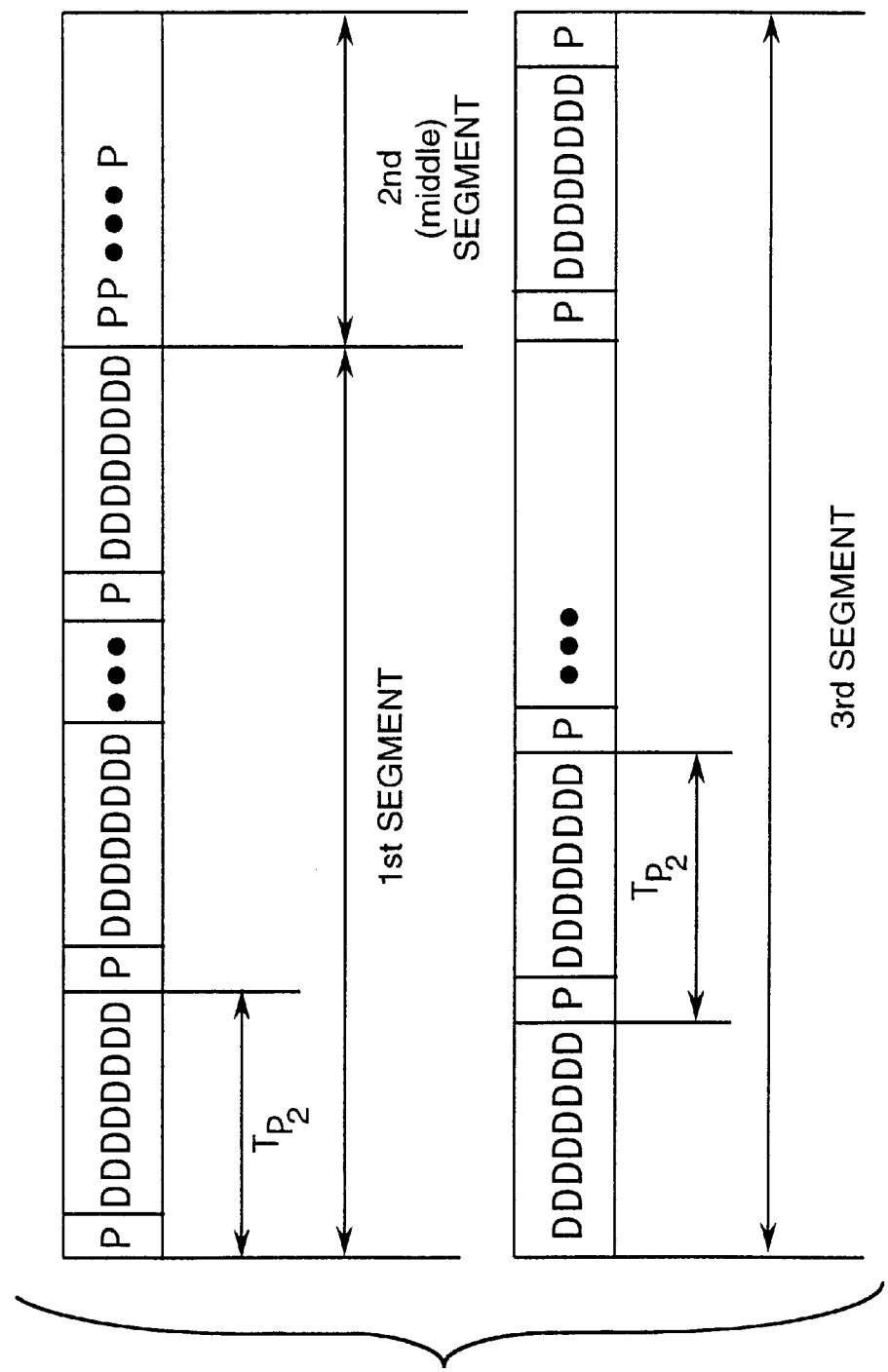

Adaptation of the pilot symbol aided carrier recovery method described hereinabove to other burst structures, such as those shown in FIGS. 2, 3 and 4, is straightforward. For the burst structure of FIG. 3, carrier reconstruction for the first segment of the burst (as it occurs in time as shown in FIG. 3) is eliminated since it comprises only pilot symbols; i.e., only the second segment bears data.

For the burst structure of FIG. 2, the middle (second) segment of the burst is processed like that of the first segment in FIG. 1 because it is there that the pilot symbols occur with greater frequency. The interpolation which produces the carrier for demodulating the first and third burst segments utilizes the pilot symbols from both segments and may include one or more of the middle segment's pilot symbols in this case. Note that the interval between pilot symbols is the same in segments one and three and that the receiver signal processing for these is similar to that for the second segment in FIG. 1. A variation of the method for bursts of the type of FIG. 2 is to recover the carrier for demodulation of the first and third segments in two distinct steps. The first utilizes the pilot symbols from the middle burst segment to the beginning of the burst. The second utilizes the pilot symbols from the middle segment to the end of the burst.

Pilot symbol aided carrier recovery for bursts of the type shown in FIG. 4 combines the modifications summarized for the cases illustrated in FIGS. 2 and 3. Namely, carrier reconstruction for the middle segment of the burst is not necessary since it comprises only pilot symbols. The two variations for first-and-third-segment carrier recovery described above for the burst of FIG. 2 apply directly.

Exemplary modulation schemes for which the techniques described herein are suitable are binary phase shift keying and quadrature phase shift keying.

While the preferred embodiments of the present invention have been shown and described herein, it will be obvious that such embodiments are provided by way of example only. Numerous variations, changes and substitutions will occur to those of skill in the art without departing from the invention herein. Accordingly, it is intended that the invention be limited only by the spirit and scope of the appended claims.

What is claimed is:

1. A receiver for receiving and demodulating a received signal comprising a transmitted burst of modulated symbols, each burst of symbols being partitioned into at least two pilot inter-symbol interval segments of differing lengths, each segment comprising at least one pilot symbol, and at least one segment comprising a combination of pilot and data symbols, the receiver comprising:

selection circuitry for selecting the pilot symbols in the respective segments of the transmitted burst;

circuitry for calculating an estimate of the received signal's carrier from the pilot symbols in the shorter pilot inter-symbol interval segment and for providing the complex conjugate thereof;

circuitry for estimating the received signal's carrier frequency based on pilot symbols received during the shorter pilot inter-symbol interval segment;

circuitry for generating the complex conjugate of the estimated carrier at the pilot symbol sample times for the longer pilot inter-symbol interval segment from the estimate of the received signal's carrier frequency;

a first multiplier for multiplying the pilot symbols for the longer pilot inter-symbol interval segment by the complex conjugate of the estimated carrier for the longer pilot inter-symbol interval segment;

circuitry for calculating an estimate of the received signal's residual carrier based on the output of the first multiplier and for providing the complex conjugate thereof;

a second multiplier for multiplying the complex conjugate of the estimated carrier for the longer pilot inter-symbol interval segment by the complex conjugate of the estimate of the received signal's residual carrier for the longer pilot inter-symbol interval segment;

a switch for selecting between the complex conjugate of the estimated carrier for the shorter pilot inter-symbol interval segment and the output of the second multiplier;

a third multiplier for receiving, through a delay circuit, the delayed received symbols, and for multiplying the delayed received symbols by the estimated carrier selected by the switch for demodulating the shorter and longer pilot inter-symbol interval segments, respectively, depending on the position of the switch; and a detection filter for receiving the output of the third multiplier and for providing demodulated soft output data therefrom.

2. The receiver of claim 1 wherein the transmitted burst of symbols comprises first and second segments, each segment comprising at least one pilot symbol and at least one data symbol, the second segment having a longer interval between pilot symbols than the first segment.

3. The receiver of claim 1 wherein the transmitted burst of symbols comprises first, second and third segments, such that the interval between pilot symbols is substantially the same for the first and third segments.

4. The receiver of claim 1 wherein the transmitted burst of symbols comprises first and second segments, such that the first segment comprises only pilot symbols, and the second segment comprises a combination of pilot symbols and data symbols.

5. The receiver of claim 1 wherein the transmitted burst of symbols comprises first, second and third segments, such that the interval between pilot symbols is substantially the same for the first and third segments, and further such that the second segment comprises only pilot symbols.

6. A method for demodulating a received signal comprising transmitted bursts of modulated symbols, each transmitted burst of symbols being partitioned into at least two pilot inter-symbol interval segments of differing lengths, each segment comprising at least one pilot symbol, and at least one segment comprising a combination of pilot and data symbols, the steps of the method comprising:

(a) receiving and selecting the pilot symbols in the respective segments of the transmitted burst;

(b) calculating an estimate of the received signal's carrier from the pilot symbols in the, shorter pilot inter-symbol interval segment and providing the complex conjugate thereof;

(c) estimating the received signal's carrier frequency based on pilot symbols received during the shorter pilot inter-symbol interval segment;

(d) generating the complex conjugate of the estimated carrier at the pilot symbol sample times for the longer pilot inter-symbol interval segment from the estimate of the received signal's carrier frequency;

(e) multiplying the pilot symbols for the longer pilot inter-symbol interval segment by the complex conjugate of the estimated carrier for the longer pilot inter-symbol interval segment;

(f) calculating an estimate of the received signal's residual carrier based on the output of multiplying step (e) and providing the complex conjugate thereof;

(g) multiplying the complex conjugate of the estimated carrier for the longer pilot inter-symbol interval segment by the complex conjugate of the estimate of the received signal's residual carrier for the longer pilot inter-symbol interval segment;

(h) selecting between the complex conjugate of the estimated carrier for the shorter pilot inter-symbol interval segment and the output of multiplying step (g);

(i) delaying the received symbols and multiplying the delayed received symbols by the estimated carrier selected in selecting step (h) for demodulating the shorter and longer pilot inter-symbol interval segments, respectively; and (j) filtering the output of step (i) and providing demodulated soft output data therefrom.

7. The method of claim 6 wherein the transmitted burst of symbols comprises first and second segments, each segment comprising at least one pilot symbol and at least one data symbol, the second segment having a longer interval between pilot symbols than the first segment.

8. The method of claim 6 wherein the transmitted burst of symbols comprises first, second and third segments, such that the interval between pilot symbols is substantially the same for the first and third segments.

9. The method of claim 6 wherein the transmitted burst of symbols comprises first and second segments, such that the first segment comprises only pilot symbols, and the second segment comprises a combination of pilot symbols and data symbols.

10. The method of claim 6 wherein the transmitted burst of symbols comprises first, second and third segments, such that the interval between pilot symbols is substantially the same for the first and third segments, and further such that the second segment comprises only pilot symbols.

* * * * *